US007209139B1

(12) United States Patent
Keet et al.

(10) Patent No.: US 7,209,139 B1
(45) Date of Patent: Apr. 24, 2007

(54) EFFICIENT RENDERING OF SIMILAR OBJECTS IN A THREE-DIMENSIONAL GRAPHICS ENGINE

(75) Inventors: Paul Keet, Los Angeles, CA (US); Jason Quinn Gregory, El Segundo, CA (US); Mark Evan Dochtermann, Sherman Oaks, CA (US)

(73) Assignee: Electronic Arts, Redwood City, CA (US)

( * ) Notice: Subject to any disclaimer, the term of this patent is extended or adjusted under 35 U.S.C. 154(b) by 256 days.

(21) Appl. No.: 11/031,962

(22) Filed: Jan. 7, 2005

(51) Int. Cl.
*G06T 15/00* (2006.01)
(52) U.S. Cl. .................. 345/427; 345/419; 345/423; 345/426; 382/276
(58) Field of Classification Search ............. 345/419, 345/423, 426, 427; 382/276
See application file for complete search history.

(56) References Cited

U.S. PATENT DOCUMENTS 5,870,097 A * 2/1999 Snyder et al. ............. 345/426
6,697,064 B1 * 2/2004 Kilgard et al. ............. 345/423
6,717,576 B1 * 4/2004 Duluk et al. ............... 345/419
7,015,909 B1 * 3/2006 Morgan, III et al. ....... 345/426
7,120,311 B2 * 10/2006 Snyder ....................... 382/276

\* cited by examiner

*Primary Examiner*—Phu K. Nguyen
(74) *Attorney, Agent, or Firm*—James D. Ivey

(57) ABSTRACT

Multiple instances of a single object are aggregated and submitted collectively to a graphics API for rendering. Vertices of the object are replicated into a large buffer and are modified so as to be bound to different transformation matrices in a matrix palette. An index buffer of the object is similarly replicated. Each replicated index buffer is modified to refer to vertices of a different, respective set of replicated vertices. Thus, the large vertex and index buffers are initialized to contain multiple, distinct, and independent copies of the object. Instancing logic aggregates matrix palettes of individual instances of the same object into an aggregated matrix palette and sends the aggregated vertex and index buffers of the object along with the accumulated aggregated matrix palette to the graphics API for rendering. The graphics API resolves the aggregated vertex and index buffers and matrix palette to a collection of triangles in display coordinates to be rasterized, not knowing or caring that the collection of triangles represent not one object but many objects.

9 Claims, 12 Drawing Sheets

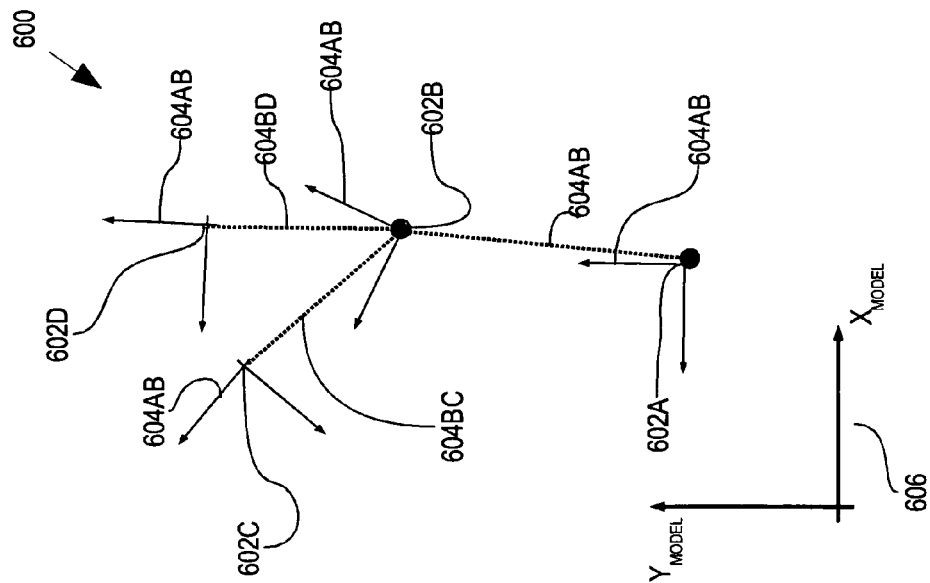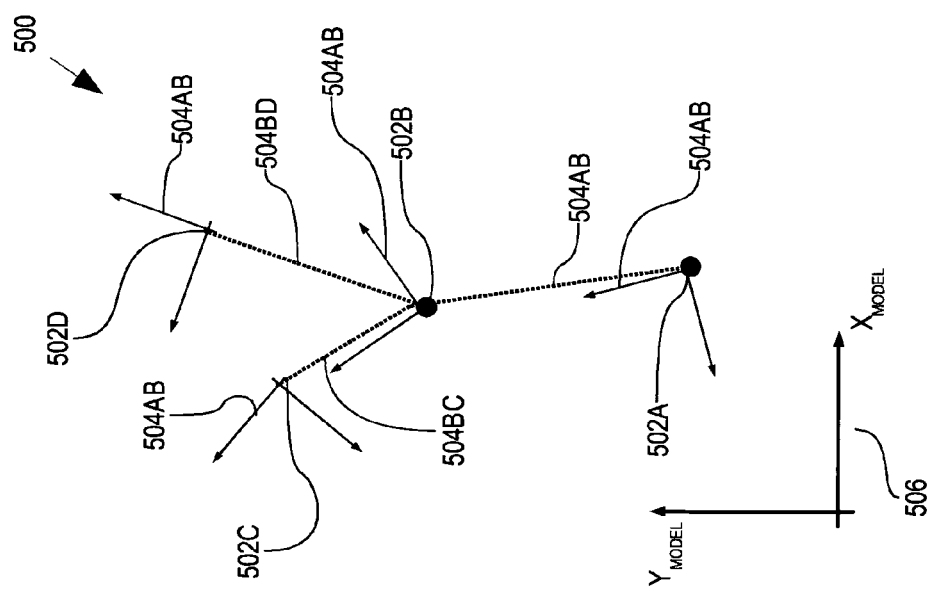
FIGURE 6

EFFICIENT RENDERING OF SIMILAR OBJECTS IN A THREE-DIMENSIONAL GRAPHICS ENGINE

FIELD OF THE INVENTION

This invention relates to the field of computer-implemented, three-dimensional graphics rendering and, more specifically, to efficient rendering of similar objects in a three-dimensional graphics engine.

BACKGROUND

Persistent and insatiable demand for ever increasing realism and detail in computer-implemented video games seems to drive the growth of personal computer performance. Unlike computer animation and movie rendering which can process individual scenes over time for playback at a higher frame rate, computer-implemented video games and computer-implemented simulators must render complete, three-dimensional (3D) scenes of a virtual world in real time, i.e., typically at a rate of thirty (30) frames per second or better. The scenes are rendered in real time in the sense that each scene typically depends in part on user-generated input signals, e.g., through physical manipulation of a user input device such as a game controller, which are not predictable prior to generating the sequence of scenes. By producing and immediately displaying such scenes responsive to user-generated input signals, a virtual 3D world responsive to, and interactive with, the user is presented.

This demand has led to the development of increasingly sophisticated and speedy graphics processors for personal computers and specialized computer systems typically referred to as video game systems. Such systems come in three primary forms: Personal computer (PC) systems, Game Console systems (e.g., Microsoft Xbox®, Sony PlayStation2®, Nintendo GameCube™) and Hand-Held Game Systems (e.g. Nintendo GameBoy Advance, Sony PSP). Game software written for the personal computer (PC) platform has a particularly challenging problem, namely, being properly operative within a wide range of hardware configurations due to the large number of motherboards, CPUs, graphics hardware and so on available for the PC platform.

Each graphics hardware configuration, i.e., graphics platform, has a unique collection of capabilities. To enable development of computer-implemented games which avail themselves fully of these capabilities, a number of graphics Application Programming Interfaces (APIs) have been produced. Graphics APIs provide a generally uniform interface and perform direct access to graphics hardware on behalf of other software such as computer-implemented games. Due to the diversity of graphics hardware in which computer-implemented games are to execute and the highly competitive marketplace for computer-implemented games, heavy reliance on graphics APIs is necessary as a practical matter.

In addition, the computer-implemented game marketplace is highly competitive. Game players will readily switch to a game which has a more realistic and entertaining experience. Thus, any improvement in rendering efficiency which allows a computer-implemented game to get more content into a virtual world without sacrificing frame rate due to overwhelming the available graphics hardware and API resources represents a significant competitive advantage in the marketplace.

SUMMARY OF THE INVENTION

In accordance with the present invention, multiple instances of a single object are aggregated and submitted collectively to a graphics API for rendering. Such significantly reduces the number of submissions to the graphics API and the processing overhead of such submissions. As a result, rendering of scenes with many objects is dramatically more efficient and many more objects can be included in a simulated world of a video game and/or 3D simulation while still providing a satisfactory virtual reality experience.

Initially, vertices of the object are replicated into a large buffer such that the buffer contains a number of copies of the vertices of the object. The vertices are modified so as to be bound to different transformation matrices in a matrix palette. An index buffer of the object is similarly replicated into a larger index buffer. The index buffer specifies triplets of vertices which define component triangles of the surface of the object. Each replicated index buffer is modified to refer vertices of a different, respective set of replicated vertices. Thus, the large vertex and index buffers are initialized to contain multiple, yet distinct and independent, copies of the object. Each distinct and independent copy is referred to as an instance of the object.

Each instance of the object is processed separately and conventionally to form pose after pose to collectively specify an animation. To render each pose, each instance of the object is submitted to instancing logic for ultimate submission to the graphics API for rendering in a computer display. Such submissions include a matrix palette which specifies transformation of the instance from its original rest pose in model coordinate space to its specified pose in world coordinate space. Since the instances are distinct and independent and refer to different matrix palettes, each instance can be separately animated by the game logic.

The instancing logic aggregates these matrix palettes of individual instances of the same object into an aggregated matrix palette until the aggregated matrix palette is full. At that time, the instancing logic sends the pre-constructed aggregated vertex and index buffers of the object along with the accumulated aggregated matrix palette to the graphics API for rendering. The graphics API resolves the aggregated vertex and index buffers and matrix palette to a collection of triangles in display coordinates to be rasterized, not knowing or caring that the collection of triangles represent not one object but many objects.

BRIEF DESCRIPTION OF THE DRAWINGS

FIG. 6 is a diagram showing the skinned 3D graphical object of FIG. 5 and another instance of the same object.

DETAILED DESCRIPTION

Figure 1:
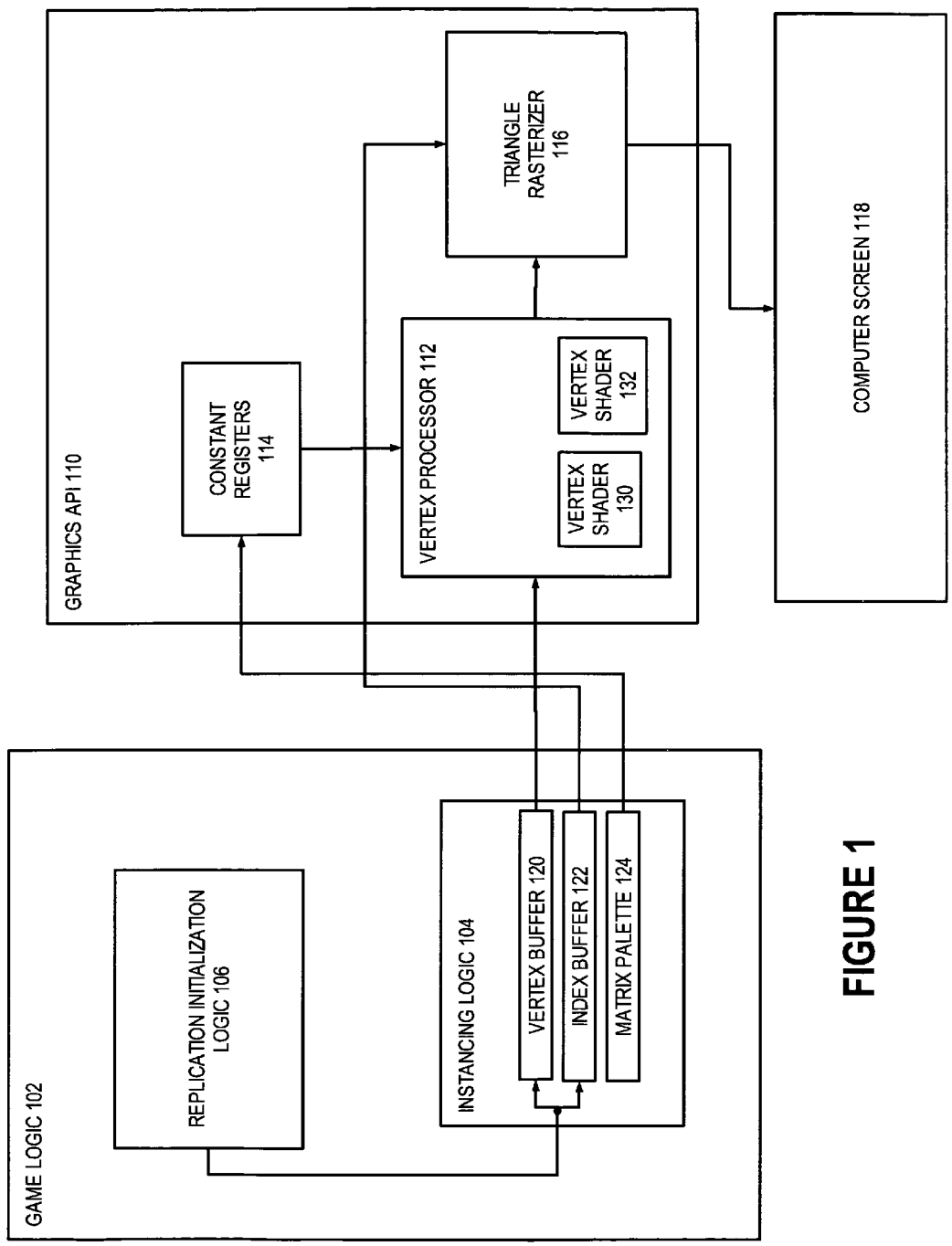
FIG. 1 is a block diagram of game logic which includes replication initialization logic and instancing logic in accordance with the present invention in conjunction with a graphics application programming interface which performs graphical operations and drawing on a computer display.

In accordance with the present invention, instancing logic 104 (FIG. 1) of game logic 102 uses a single request to graphics graphics API 110 to render, i.e., draw on computer screen 118, multiple instances of a single 3D object rather than sending a separate request for each individual instance of the object. It has been observed that some APIs introduce a delay for each received request to draw an object. One such API is the Direct3D® API of Microsoft Corporation of Redmond, Wash. Such a delay practically limits the number of objects that can be drawn using the API and still render scenes at a sufficiently high rate to produce an acceptable virtual reality experience for the user. By aggregating multiple instances of similar objects into a single object and sending a single request to graphics API 110 to draw the multiple instances as a single batch, many more objects can be included in 3D scenes and still provide a sufficiently high scene rate as displayed by graphics API 110 in computer screen 118. The result is that more lush virtual worlds can be rendered in a more realistic manner than can be currently rendered using conventional techniques within the same computer hardware context.

Graphics API 110 includes a vertex processor 112, a constant registers 114, and a triangle rasterizer 116. vertex processor 112 performs a number of functions, including transformation, lighting, and rasterization. The functions of these modules are conventional and known and are only briefly introduced here for completeness.

Vertex processor 112 transforms and lights vertices.

Transformation includes rotation, scaling, and/or translation (i.e., movement) and transforms vertices whose respective positions and normal vectors are represented in a source coordinate space into vertices whose respective positions and normal vectors are expressed in a destination coordinate space. Typically, the source coordinate space is "model space" or "world space." "Model space" generally refers to a 3D Cartesian coordinate system centered about the object being drawn. "World space" generally refers to a 3D Cartesian coordinate system fixed in a virtual world in which a game or simulation takes place, referred to herein as the game world. The destination space is a "screen space," which is a two-dimensional (2D) Cartesian coordinate system by which specific pixels of computer screen 118 can be addressed. Typically, screen space is a 2D perspective projection of a 3D Cartesian coordinate space generally referred to as "view space" or, alternatively, "camera space." View space represents a 3D space relative to a viewpoint, which is typically the origin, i.e., location (0,0,0), in the view space.

Lighting involves applying colors to vertices of an object according to so as to account for any specified intrinsic color of the object and any incident light sources.

Constant registers 114 are used by game logic 102 to pass non-geometric data to graphics API 110. Such data can vary widely, but, for the purposes of appreciation and understanding of the present invention, it is sufficient to realize that constant registers 114 are used in part to transmit the matrix palette 124 to the graphics API 110. Typically, each constant register within constant registers 114 is 128 bits wide and can therefore contain up to four 32-bit floating-point values. To pass a single 4×3 transformation matrix to graphics API 110, three (3) constant registers are used. The available storage within constant registers 114 varies depending upon the specific design of graphics hardware used to drive computer screen 118. It is this available storage that ultimately decides how many replicated instances of an object can be aggregated into a single draw request made to graphics API 110. This is described more completely below.

Triangle rasterizer 116 draws 2D triangles within computer display 118 to depict fully-transformed triangles of the object being rendered. Index buffer 122 defines the topology of the triangles: Each group of three vertex indices in index buffer 122 represents a single triangle, and each individual vertex index refers to one of the vertices in vertex buffer 120. Within triangle rasterizer 116, all vertices of vertex buffer 120 have been transformed from model- or world-space into screen space by vertex processor 112.

Figure 2:
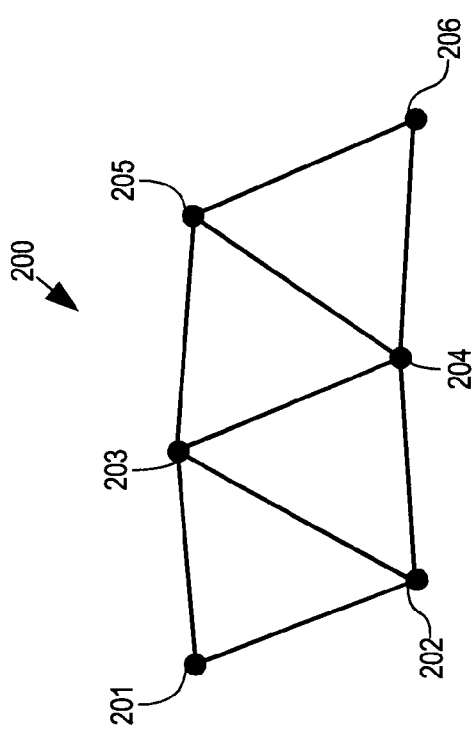
FIG. 2 is a diagram of a number of vertices organized into a triangle list.

FIG. 2 illustrates a number of triangles defined by vertices within vertex buffer 120 as grouped by index buffer 122. Vertices 201–206 are defined by index buffer 122 to define the following four (4) triangles: (i) vertices 201, 203, and 202; (ii) vertices 202, 203, and 204; (iii) vertices 203, 205, and 204; and (iv) vertices 204, 205, and 206. It should be noted that the triangles are defined in a clockwise order to assist in hidden surface removal; triangles which are defined in a counter-clockwise order after transformation are determined to be facing away from the user and therefore not visible. Such triangles are simply not drawn to avoid drawing of surfaces not visible to the user.

It is helpful to better understand and appreciate the present invention to consider two kinds of 3D objects that can be rendered by modern graphics hardware: rigid and skinned. As their name implies, rigid objects are composed of triangles whose vertices do not deform relative to one another. The object as a whole can be translated, rotated or scaled within the game world, but the relative positions of all the vertices in the object remain fixed.

Skinned objects are objects that can deform based on the motions of two or more joints in a joint hierarchy known as a skeleton. Skeletons and joints are conventional and known components of objects defined in 3D space for computer-generated graphics but are described here briefly for completeness. In the context of computer graphics, a "skeleton" is somewhat analogous to the human skeleton and is made up of bones and joints. The skeleton is defined as a hierarchical collection of joints. Strictly speaking, the "bones" are simply the imaginary lines drawn between the joints, and are of no concern in computer graphics. However, it is important to note that in common computer graphics vernacular the term "bone" is often mis-used to refer to what we call a "joint" in this disclosure.

Figure 5:
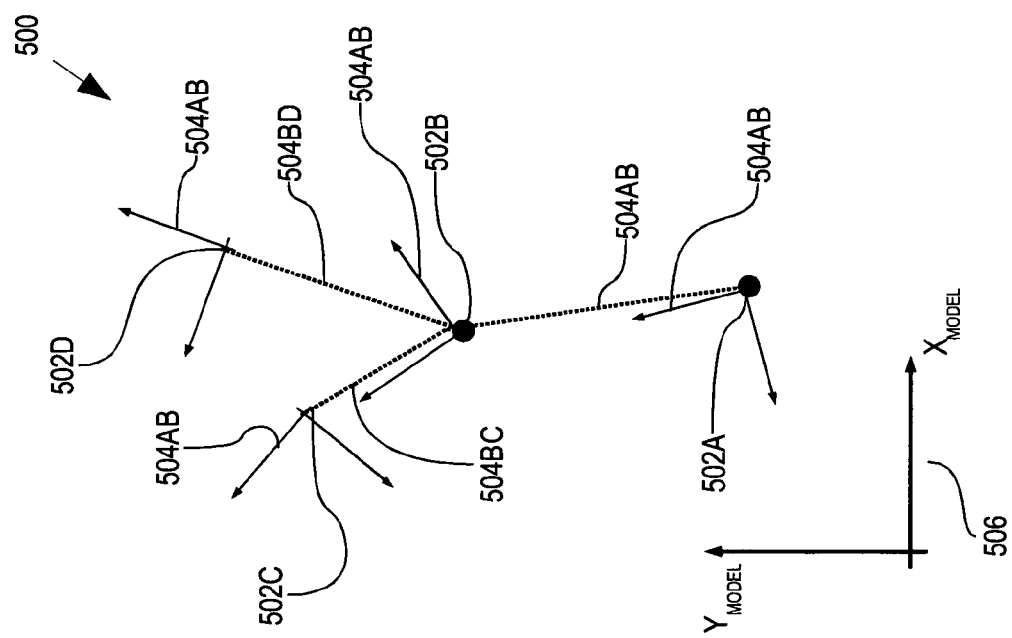
FIG. 5 is a diagram illustrating hierarchical joints of a skinned 3D graphical object and associate bones and coordinate spaces.

FIG. 5 is illustrative. Skeleton 500 includes four (4) joints, and might represent a tree with a trunk and two branches, or a simple character with a torso and two arms. Joint 502A is the root of the hierarchy. Joint 502B is the only child of the root joint 502A and, as such, moves with joint 502A but is also capable of movement relative to joint 502A. Joints 502C and 502D are children of 502B. Joints 502C and 502D are leaf nodes in the hierarchy, and hence have no children joints. Dotted lines represent bones 504AB, 504BC and 504BD, but the bones play no role in 3D graphics other than to permit convenient visualization of the joints.

Each joint defines a 3D Cartesian coordinate system. The position, orientation and scale of any joint's coordinate system can be specified relative to its parent joint in the hierarchy. The parent coordinate system of the root joint is taken to be model space, since the root joint has no parent joint by definition. Model space 506 is the parent space of coordinate space 508A of joint 502A. Associated with joint 502B is coordinate space 508B and is the child of coordinate space 508A. The coordinate space of joint 502C is coordinate space 508C, and the coordinate space of joint 502D is coordinate space 508D. Coordinate spaces 508C–D are both children of coordinate space 508B. It should be noted that the axes of a joint's Cartesian coordinate space need not align with the bone or bones emanating from that joint (again reinforcing the irrelevance of the bones in 3D computer graphics). It should also be noted that, in FIG. 5, coordinate spaces 506 and 508A–D are shown in 2D for convenience. In a real 3D graphics application, these coordinate spaces would be 3D coordinate spaces.

A deformable or "skinned" 3D object consists of vertices which are bound to one or more joints in a skeleton. As the skeleton animates, i.e., as the joints of the skeleton move with respect to one another, the 3D object defined with respect to the skeleton deforms to follow the motions of the skeleton, much as a human's skin "follows" his bones in real life.

In the simplest case of a vertex bound to a single joint, the vertex maintains a constant position relative to that joint's local coordinate system. In other words, the vertex's joint space Cartesian coordinates are constant over all possible motions of the skeleton. As the joint moves relative to the other joints and model space, the vertex moves with the joint (i.e., its model space Cartesian coordinates vary in accordance with changes to the coordinate space of the joint).

In the more complex case of a vertex bound to multiple joints, a series of weights define how much influence the position, orientation and scale of each joint's coordinate system will have on the final position of the vertex. For example, if a vertex is bound to two (2) joints, then two (2) weights are required, a respective one for each of the bound joints. The final position of the multi-joint vertex is calculated as a simple weighted average of the respective positions to which the vertex would have resolved had the vertex been bound to each joint alone.

A skeleton can take on an infinite number of unique configurations by suitable translation, rotation and/or scaling transformations of each joint's coordinate system relative to the coordinate system of the joint's parent. A single configuration of a skeleton's joints is known as a "pose." An "animation" is just a specification of how a skeleton's pose changes over time.

The number of joints of a skeleton is sometimes referred to as the joint count of the skeleton. A pose of a skeleton can be fully specified by transformation matrices whose dimensions are 4×3 and that are equal in number to the joint count of the skeleton. Each transformation matrix represents the translation, rotation, and scale of a particular joint's coordinate system, relative to the joint's immediate parent. Alternatively, the coordinate space of each joint can be relative to model space. In an alternative representation, 4×3 transformation matrices are replaced by (i) a 3-element vector specifying the translation component of the transform, (ii) a 4-element quaternion specifying the rotation, and (iii) a single scalar for the scale. This alternative representation facilitates blending of poses in order to combine the effects of two or more different animations on a single skeleton. Such blending can be accomplished using spherical interpolation or linear interpolation.

Once a final pose has been calculated for a skeleton, a matrix palette, e.g., matrix palette 124, is generated. The matrix palette is an array of transformation matrices equal in number to the joint count, much like the representation of the pose. However, instead of specifying the translation, rotation, and scale of each joint relative to the coordinate space of the joint's parent or of the object, the transformation matrices in matrix palette 124 transform an object's vertices from their "rest pose" or "bind pose" (the position the vertex was in when the object was originally created) into the final pose in world coordinates. The mathematics for generating a matrix palette from a pose are beyond the scope of this brief discussion, but can be found in virtually any currently available 3D graphics textbook. For the purposes of the present discussion, matrix palette 124 simply represents an array of transforms applied by vertex processor 112 of graphics API 110 to the vertices of a 3D object during rendering. The key point here is that the joint indices, e.g., joint indices 308A–B described below, which are embedded within each vertex dictate which entry or entries in matrix palette 214 will be applied during vertex transformation by graphics API 110.

This is the primary feature of graphics API 110 that is exploited by instancing logic 104 in a manner described more completely below to draw many instances of a single object in a single draw command sent to API 110. The matrix palette specifies transformations from the rest pose to the final pose in world coordinates for all vertices of an object and the vertices are collected into separate, albeit typically tessellated, triangles which are to be rendered by triangle rasterizer 116.

Prior to rendering any 3D scenes, initialization logic 106 of game logic 102 creates replicated vertex and index buffers for each unique object that might be visible during game play. This initialization involves copying the original vertex and index buffers of the object into larger destination vertex and index buffers, e.g., vertex buffer 120 and index buffer 122. After initialization, vertex buffer 120 and index buffer 122 contain the maximum number of instances of the object that can be rendered by the graphics hardware driving computer display 118 using a single request to graphics API 110. That maximum number is sometimes referred to as the replication count of the object and depends upon available storage of constant registers 114 and the joint count of the object. The calculation of the replication count is described in more detail below.

To cause a 3D object to be drawn by graphics API 110 in computer screen 118, instancing logic 104 collects instances of each unique object in the scene as they are rendered, and defers submitting them to the graphics API 110 for drawing. Instancing logic 104 aggregates transformation matrices for all instances of the same object by concatenating the transformation matrices onto a matrix palette, e.g., matrix palette 124. Instancing logic 104 can collect instances of an object until the number of collected instances reaches the replication count for the object. Once that number is reached, or when there are no more instances of the given object in the current scene, instancing logic 104 submits the matrix palette and corresponding vertex and index buffers to graphics API 110 for rendering. The net result is that each request to graphics API 110 renders the maximum possible number of instances of each unique object in the scene. This minimizes the impact of the intrinsic overhead of making a request to the API 110, and thereby maximizes rendering throughput.

Figure 3:
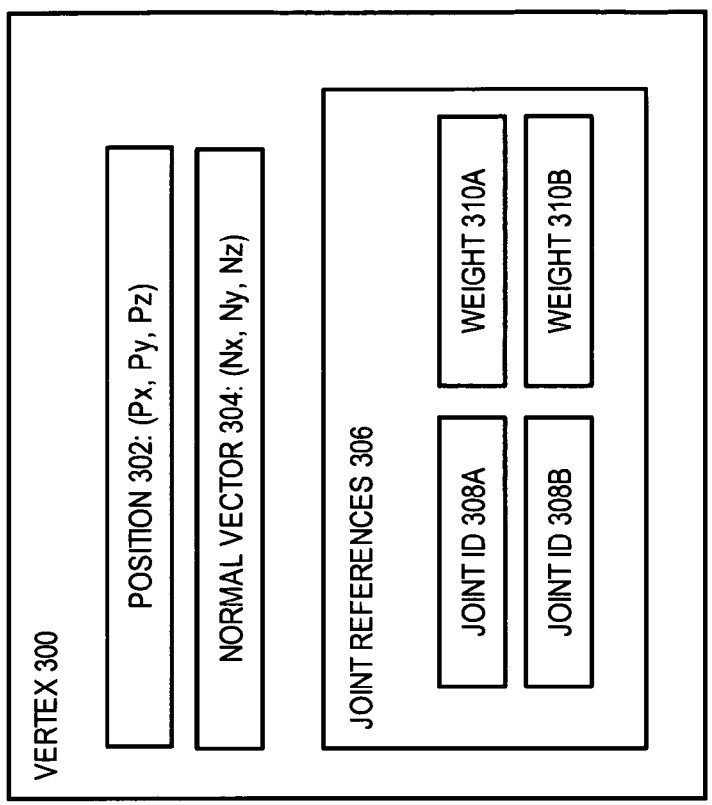
FIG. 3 is a block diagram of a vertex data structure as processed by the instancing logic of FIG. 1.

Vertex 300 (FIG. 3) is representative of the information stored for each vertex in vertex buffer 120 (FIG. 1) and sent to graphics API 110 for drawing an object defined in part by vertex 300. Vertex 300 includes a position 302, a normal vector 304, and joint references 306. Position 302 specifies the position of vertex 300 in the model coordinate space or the world coordinate space. Position 302 typically specifies x, y, and z coordinates in that coordinate space.

Normal vector 304 is a vector whose magnitude is normalized (e.g., to a value of one) and whose direction is normal to the surface of the object being modeled. Normal vector 304 is typically used to determine the degree to which lights impinging upon the surface at vertex 300 affect the color and/or luminance of the object at vertex 300.

Joint references 306 identify one or more joints with which vertex 300 is associated. joint reference 306 is shown to include two joint identifiers 308A–B and two respective joint weights 310A–B. It should be appreciated that fewer or more than two joint identifiers and weights can be stored in joint reference 306.

Some very simple objects may have no joints at all. An example of such an object is a rock. In this illustrative embodiment, instancing logic 104 assigns at least one joint to every object, adding one if necessary to an object without joints. Adding a joint to an object which no joints effectively converts that object from a rigid object to a skinned object and allows use of transformation matrix 124 to draw numerous instances of the object in a single draw command in the manner described herein.

Instancing logic 104 leverages from the independent transformation of joints of an object within graphics API 110 to represent multiple instances of a single object in a single request to graphics API 110 for drawing. To better appreciate and understand the notion of a single draw request representing multiple objects, it is helpful to consider the example of FIG. 6 in which skeleton 500 of a plant is accompanied by a skeleton 600 of a second plant of generally the same configuration but positioned, oriented, and sized independently. Briefly, instancing logic 104 combines vertices and transformation matrices of both plants into a single collection of vertices and transformation matrices for submission to graphics API 110 for drawing. The manner in which instancing logic 104 does this is described more completely below.

Figure 4:
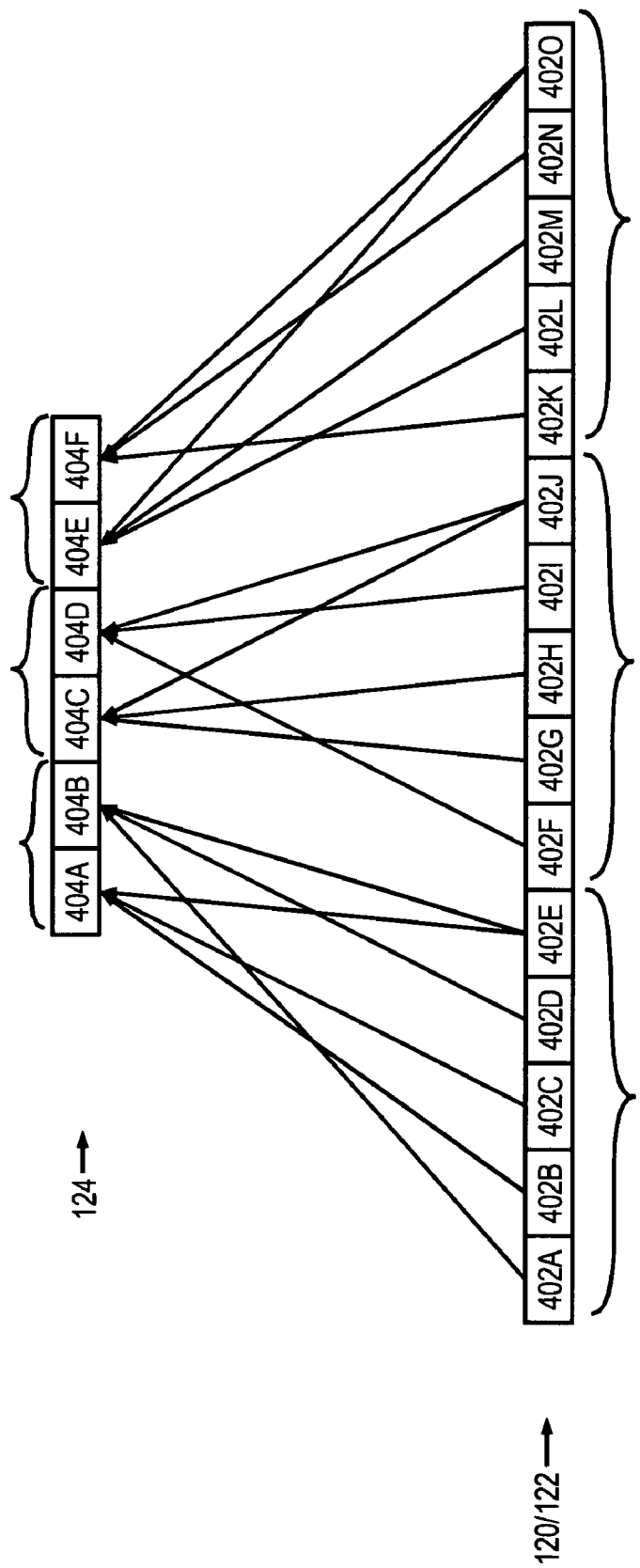
FIG. 4 is a block diagram illustrating replicated and aggregated vertices associated with distinct and independent transformation matrices.

FIG. 4 shows three (3) replicated objects represented as a single object by instancing logic 104 for submission to graphics API 110. Vertices 402A–O are analogous to vertex 300 (FIG. 3) described above and are stored in vertex buffer 120 and sequenced as specified in index buffer 120. Transformation matrices 404A–F are stored in matrix palette 124 and are referenced by joint identifiers of respective ones of vertices 402A–O as shown by arrows in FIG. 4. Vertices 402A–E and transformation matrices 404A–B define the original instance of an object. It is understood that a single object defined in 3D world coordinates will likely have many more than five (5) vertices and two (2) transformation matrices. However, a very simple object is selected for illustration purposes.

The next five (5) vertices, namely, vertices 402F–J, are direct copies of vertices 402A–E except that the respective joint identifiers are adjusted to identify transformation matrices 404C–D rather than transformation matrices 404A–B. For example, vertex 402F is a direct copy of vertex 402A except that vertex 402F is associated with transformation matrix 404D while vertex 402A is associated with transformation matrix 404A. Collectively, vertices 402F–J and transformation matrices 404C–D represent a second instance of the object. The replication of vertices and the adjustment of respective joint identifiers is described more completely below.

The last five (5) vertices, namely, vertices 402K–O, are also direct copies of vertices 402A–E except that the respective joint identifiers are adjusted to identify transformation matrices 404E–F rather than transformation matrices 404A–B. For example, vertex 402K is a direct copy of vertex 402A except that vertex 402K is associated with transformation matrix 404E while vertex 402A is associated with transformation matrix 404A. In addition, vertices 402K–O and transformation matrices 404E–F collectively represent a third instance of the object.

To avoid all three instances of the object looking identical and appearing in identical locations, transformation matrices 404C–D differ from from transformation matrices 404A–B, respectively. Using different placement, orientation, and scaling in transformation matrices 404C–D than are represented in transformation matrices 404A–B respectively, the second instance of the object can be shown to be in a different place, with a different orientation, and at a different size than the first instance. Similarly, transformation matrices 404E–F can differ from transformation matrices 404A–B, respectively, to show the third instance in a different place, with a different orientation, and at a different size than the first and second instances.

Figure 7:
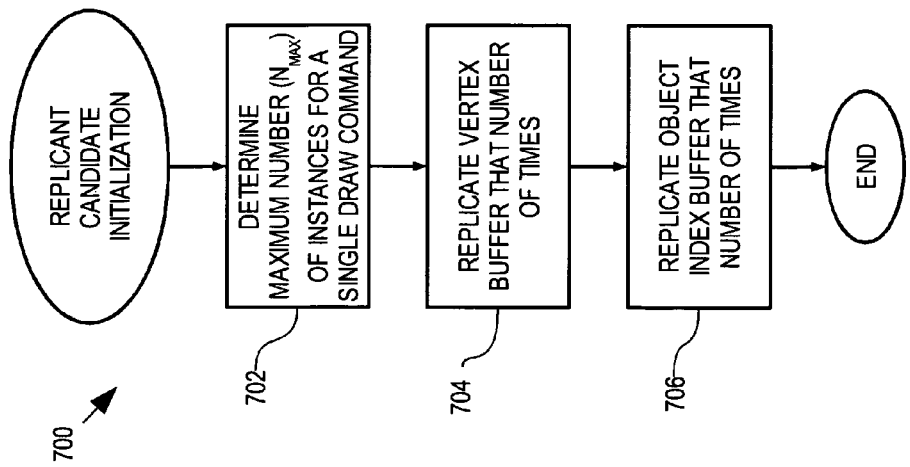
FIG. 7 is a logic flow diagram illustrating initialization of aggregated vertex and index buffers in accordance with the present invention.

A model, i.e., a data structure representing an object to be depicted in 3D graphics by game logic 102, is initialized for replication in accordance with the present invention in a manner illustrated by logic flow diagram 700 (FIG. 7). Candidacy of each object for replication in accordance with the present invention is determined in a manner described more completely below. At the start of logic flow diagram 700, the particular object initialized has already been determined to be the subject of replication, except that step 702 described below can be performed as part of the initial replication evaluation process. In this illustrative embodiment, logic flow diagram 700 is performed once during initial loading of objects by replication initialization logic 106. By allowing a significant portion of the replication processing to before only once at initialization, significant improvement to 3D rendering efficiency is achieved.

In step 702, replication initialization logic 106 determines the maximum number of instances of the subject object that can be processed in a single draw command by graphics API 110. Typically, the primary constraints are the maximum number of transformation matrices that can be stored by within constant registers 114 and the number of joints of the subject object, i.e., the number of transformation matrices required to render a single instance of the subject object. This number of joints is sometimes referred to as a "joint count." In this embodiment, the maximum number of instances of the subject object that can be processed in a single draw command by graphics API 110 is the quotient of the maximum number of transformation matrices that can be stored by transformation module 112 divided by the joint count of the subject object, and the quotient is truncated to an integer value. This value is sometimes referred to as a replication count and is determined during the initial qualification of the subject object for replication in the manner described herein.

Figure 8:
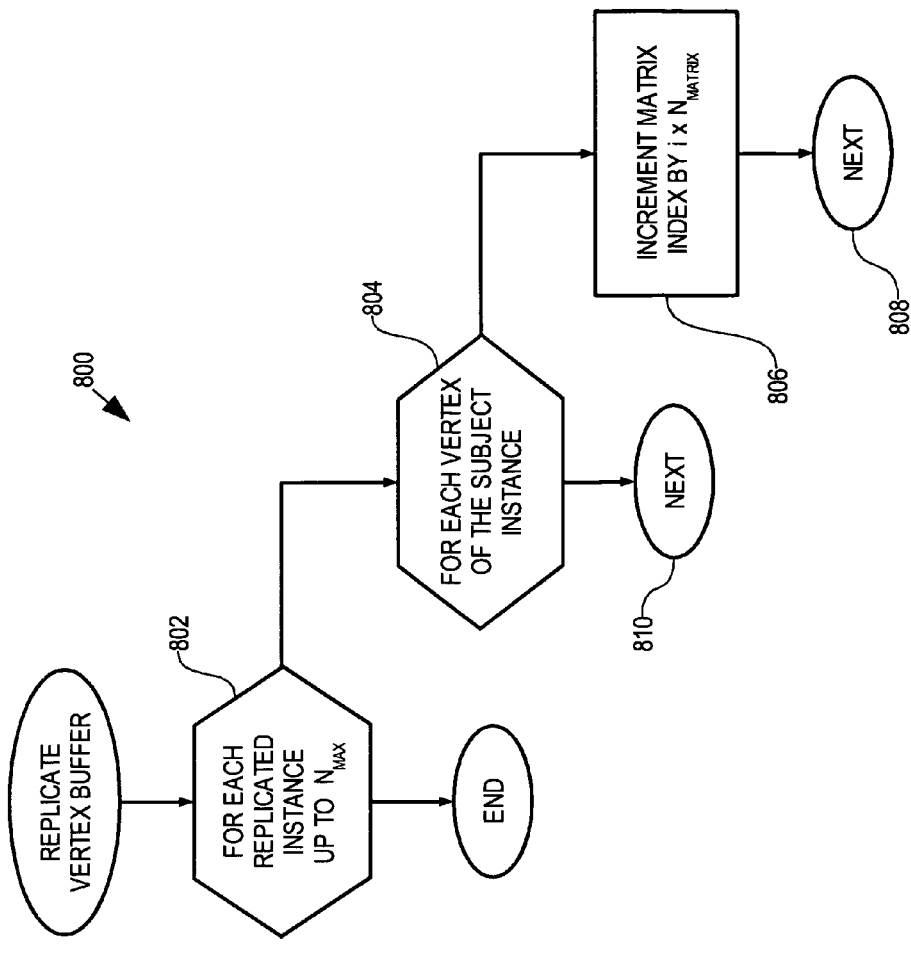
FIGS. 8 and 9 are each a logic flow diagram illustrating a component of the logic flow diagram of FIG. 7.

In step 704, replication initialization logic 106 replicates the vertex buffer of the subject object a number of times equal to the replication count determined in step 702. In addition, replication initialization logic 106 adjusts joint indices, e.g., joint indices 308A–B, in the manner illustrated in logic flow diagram 800 (FIG. 8).

Loop step 802 and next step 810 define a loop in which each replicated instance of the subject object—each instance other than the first, original instance—is processed by replication initialization logic 106 according to steps 804–808. During each iteration of the loop of steps 802–810, the particular instance of the subject object processed according to steps 804–808 is sometimes referred to as the subject instance.

Loop step 804 and next step 808 define a loop in which each vertex of the subject instance is processed by replication initialization logic 106 according to step 806. During each iteration of the loop of steps 804–808, the particular vertex of the subject instance processed according to step 806 is sometimes referred to as the subject vertex.

In step 806, replication initialization logic 106 increments each index into matrix palette 124 of the subject vertex by an amount equal to the product of the joint count of the subject object and the sequence number of the replicated instance. For example, in the first replicated instance of the subject object, replication initialization logic 106 increments each joint index, e.g., joint indices 308A–B (FIG. 3), by the joint count of the subject object. In the second replicated instance, replication initialization logic 106 increments each joint index by the twice the joint count of the subject object. In the third replicated instance, replication initialization logic 106 increments each joint index by the thrice the joint count of the subject object. And so on.

FIG. 4 is illustrative of the joint index incrementing of step 806. The number of joints of the subject object in the example of FIG. 4 is two (2), and the joint index of vertex 402A is two (2) to identify transformation matrix 404B. In the first replicated instance of vertex 402A, i.e., vertex 402F, the joint identifier (two, identifying transformation matrix 404B) is incremented by the product of one (for the first replicated instance) and the joint count (two), i.e., incremented by two to now refer to transformation matrix 404D. In the second replicated instance of vertex 402A, i.e., vertex 402K, the joint identifier (two, identifying transformation matrix 404B copied from vertex 402A) is incremented by the product of two (for the second replicated instance) and the joint count (two), i.e., incremented by four to now refer to transformation matrix 404F.

Once replication initialization logic 106 has completed processing according to step 806 for all vertices (in the loop of steps 804–808) for all replicated instances (in the loop of steps 802–810), processing according to logic flow diagram 800, and therefore step 704 (FIG. 7), completes.

Figure 9:
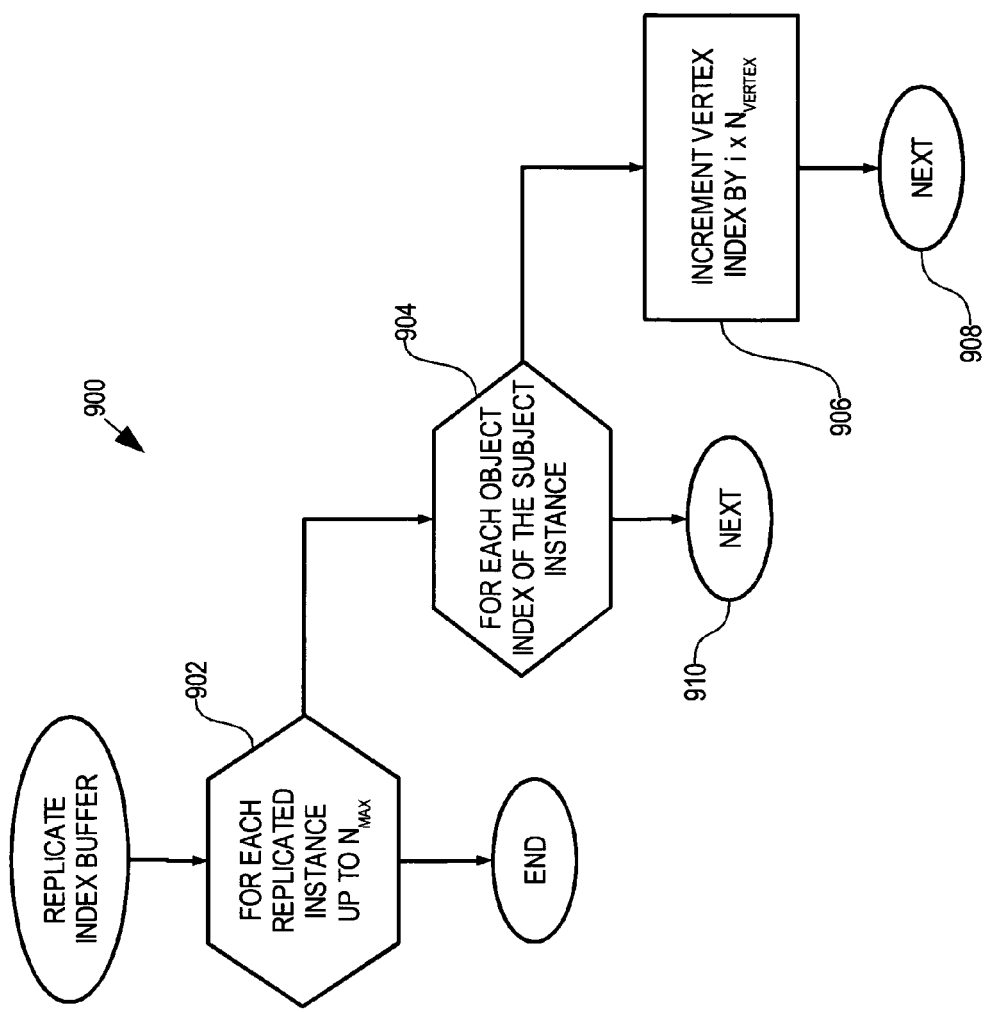

In step 706, replication initialization logic 106 replicates the object index buffer of the subject object a number of times equal to the replication count determined in step 702. In addition, instancing logic 104 adjusts vertex indices in the manner illustrated in logic flow diagram 900 (FIG. 9) to replicate the geometry of the subject object.

Loop step 902 and next step 910 define a loop in which each replicated instance of the subject object—each instance other than the first, original instance—is processed by replication initialization logic 106 according to steps 904–908. During each iteration of the loop of steps 902–910, the particular instance of the subject object processed according to steps 904–908 is sometimes referred to as the subject instance.

Loop step 904 and next step 908 define a loop in which each object index of the subject instance is processed by replication initialization logic 106 according to step 906. During each iteration of the loop of steps 904–908, the particular object index of the subject instance processed according to step 906 is sometimes referred to as the subject object index.

In step 906, instancing logic 104 increments each index into vertex buffer 120 of the subject object index by an amount equal to the product of the number of vertices of the subject object and the sequence number of the replicated instance. For example, in the first replicated instance of the subject object, replication initialization logic 106 increments each vertex index by the vertex count of the subject object. In the second replicated instance, replication initialization logic 106 increments each vertex index by the twice the vertex count of the subject object. In the third replicated instance, replication initialization logic 106 increments each vertex index by the thrice the vertex count of the subject object. And so on.

Once replication initialization logic 106 has completed processing according to step 906 for all object indices (in the loop of steps 904–908) for all replicated instances (in the loop of steps 902–910), processing according to logic flow diagram 900, and therefore step 706 (FIG. 7), completes. After completion of step 706 by replication initialization logic 106, initialization of the subject object for replication in accordance with the present invention is completed.

Figure 10:
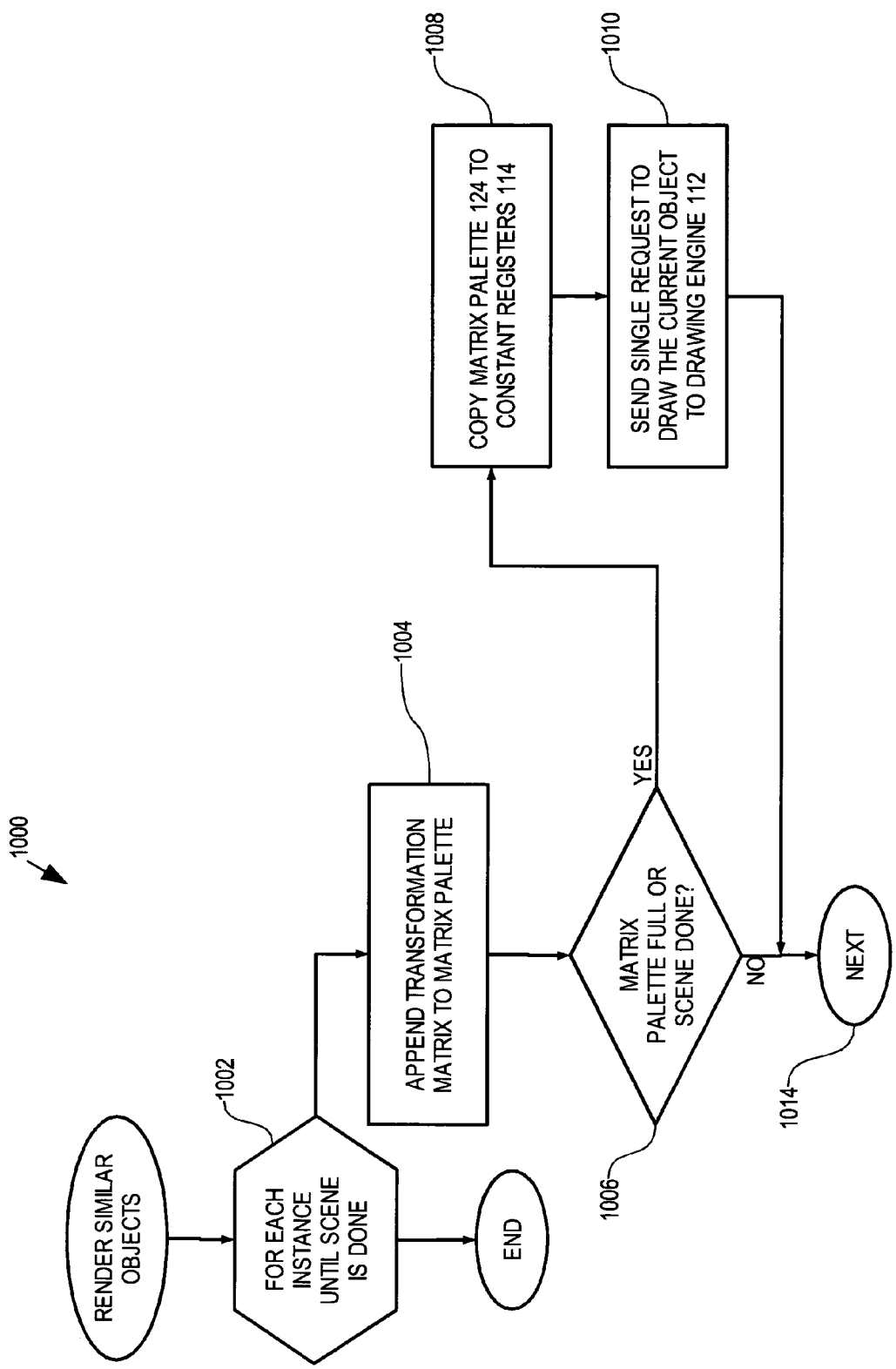
FIG. 10 is a logic flow diagram illustrating the aggregation of matrix palettes in accordance with the present invention.

After processing according to logic flow diagram 700, instancing logic 104 includes vertex and object index buffers which represent a number of instances of the subject object as separate and discrete objects combined into a single vertex buffer and a single object index buffer. Each instance of the subject object is moved independently during execution of game logic 102 by manipulation of transformation matrices of matrix palette 124. The combination of multiple instances into a singe draw command issued to graphics API 110 is illustrated by logic flow diagram 1000 (FIG. 10).

It should be appreciated that, prior to processing according to logic flow diagram 1000, a number of conventional things have happened to the multiple similar objects, e.g., to the multiple instances of the subject object. Each of the similar objects has its own respective position in the game world. In the manner described briefly above, game logic 102 determines the transformation matrices for each of the similar objects from its original position and orientation in object coordinate space to a new pose in the game world. For example, a virtual jungle world may have hundreds or even thousands of similar plant objects, each having its unique combination of position, orientation, and size in the game world represented by each plant's respective transformation matrices, one per joint of the plant object. Changes in the state of an individual plant, e.g., in response to wind or other objects moving the branches of the plant, can require modifications to the transformation matrices of the respective joints to represent such changes. The management of the various transformation matrices of the various objects of game logic 102, including those of replicated objects, is performed by game logic 102 in a conventional manner.

In addition, while a virtual jungle world may include replicants of a plant object numbering in the thousands, it is likely that only a small minority of those are visible from any given viewpoint. In this illustrative embodiment, game logic 102 employs conventional methods of viewable frustum culling to eliminate non-viewable instances of the subject object as candidates for display by graphics API 110.

Furthermore, game logic 102 processes the entirety of objects represented in the virtual world in a conventional manner except that game logic 102 submit objects for drawing to instancing logic 104 rather than directly to graphics API 110. Such permits as much of game logic 104 as possible to remain conventional with much of the replication logic described herein to be implemented entirely within instancing logic 104 and replication initialization logic 106.

In response to receipt of drawing commands received from game logic 102, instancing logic 104 accumulates the individual objects in packets for deferred rendering. Objects which are not replicated are submitted by instancing logic 104 to graphics API 110 immediately for rendering in a conventional manner. In the manner described more completely below, objects which are replicated are collected and aggregated until respective matrix palettes are full at which point instancing logic 104 submits the aggregated instances to graphics API 110 for rendering. When a scene is complete, graphics logic 102 so indicates to instancing logic 104 and, in response, instancing logic 104 sends any aggregated and previously unsubmitted instances to graphics API 110 for rendering.

Instancing logic 104 sends non-replicated objects to graphics API 110 individually in a conventional manner, i.e., one draw command per non-replicated object. For each instance of a replicated object, instancing logic 104 gathers the instance into a list of instances of that particular replicated object for processing in batches. As described more completely below, individual objects include a flag which indicates whether a particular object is a candidate for replication and, if so, an identifier such that instancing logic 104 can identify individual objects which are instances of the same replicated object. Logic flow diagram 1000 (FIG. 10) illustrates the processing of all collected instances of a replicated object that have been received by instancing logic 104 for a complete scene. The particular replicated object processed by instancing logic 104 in a single performance of the steps of logic flow diagram 1000 is sometimes referred to as the subject object.

Loop step 1002 and next step 1014 define a loop in which instancing logic 104 processes each viewable instance of the subject object according to steps 1004–1012. The particular instance of the subject object processed by instancing logic 104 according to an iteration of the loop of steps 1002–1014 is sometimes referred to as the subject instance in the context of FIG. 10.

In step 1004, instancing logic appends the transformation matrices of the subject instance of the subject object to matrix palette 124. Prior to loop step 1002, instancing logic 104 clears matrix palette 124 such that it's empty.

In test step 1006, instancing logic 104 determines whether matrix palette 124 is full, i.e., includes a number of matrices equal to the replication count as determined in step 702 times the joint count of the subject object, or whether all instances of the current scene have been represented in matrix palette 124. If not, processing by instancing logic 104 transfers through next step 1014 to loop step 1002 in which the next viewable instance of the subject object is processed according to the loop of steps 1002–1014. Thus, transformation matrices of instances of the subject object are accumulated in matrix palette 124 in repeated performances of step 1004 by instancing logic 104.

Eventually, instancing logic 104 fills matrix palette 124 or completes the scene by having processed all viewable instances of the subject object in the repeated performances of step 1004. Under such circumstances, processing transfers from test step 1006 to step 1008.

In step 1008, instancing logic 104 sends matrix palette 124 to transformation module 116. In step 1010, instancing logic 104 sends vertex buffer 120 and object index buffer 122 to vertex processor 112 in a single draw command. As described above, vertex buffer 120, object index buffer 122, and matrix palette 124 collectively define multiple objects aggregated together to be executed in a single draw command by graphics API 110. If processing by instancing logic 104 transferred to step 1008 because matrix palette 124 is full, instancing logic 104 sends the entirety of vertex buffer 120 and object index buffer 122 to vertex processor 112 in step 1010. Conversely, if processing by instancing logic 104 transferred to step 1,008 because all instances of the scene have been accumulated in repeated performances of step 1004, instancing logic 104 sends only enough of vertex buffer 120 and object index buffer 122 to represent the number of instances accumulated in matrix palette 124 to vertex processor 112 in step 1010.

After step 1010, processing transfers through next step 1014 to loop step 1002 in which the next instance of the subject object is processed according to steps 1004–1010. When all viewable instances of the subject object have been processed according to the loop of steps 1002–1014, processing according to logic flow diagram 1000 completes.

As described above, only selected objects in the game world are replicated in the manner described herein. Each object represented in the 3D virtual world is created and defined by a graphical artist. Such artists use conventional 3D modeling tools such as the Maya™ 3D modeling tool of Alias Systems Corp. and the 3ds max® modeling tool of Discreet of Autodesk, Inc. to specify objects to be included in the game world. Such artists identify objects which are preferred candidates for replication. Such objects tend to be those of which many instances are included in the 3D virtual world, such as plants, rocks, trees, or other commonly appearing objects. Rather than creating hundreds of trees, the artist creates a single tree and flags the tree as a candidate for replication.

In this illustrative embodiment, the artist does not have the last word as to whether a particular object is replicated for collective drawing in the manner described above. Instead, instancing logic 104 applies various criteria to determine whether replication for collective drawing in the manner described above is likely to be possible and/or sufficiently beneficial. One particular concern regarding replicating too many objects is that memory set aside for video can be overwhelmed by storing many, very long vertex buffers, object index buffers, and matrix palettes. Another concern is that the more complex objects in a 3D virtual world tend to have relatively few instances and therefore tend not to derive as much benefit from replication as do simpler objects which tend to have relatively many instances.

Figure 11:
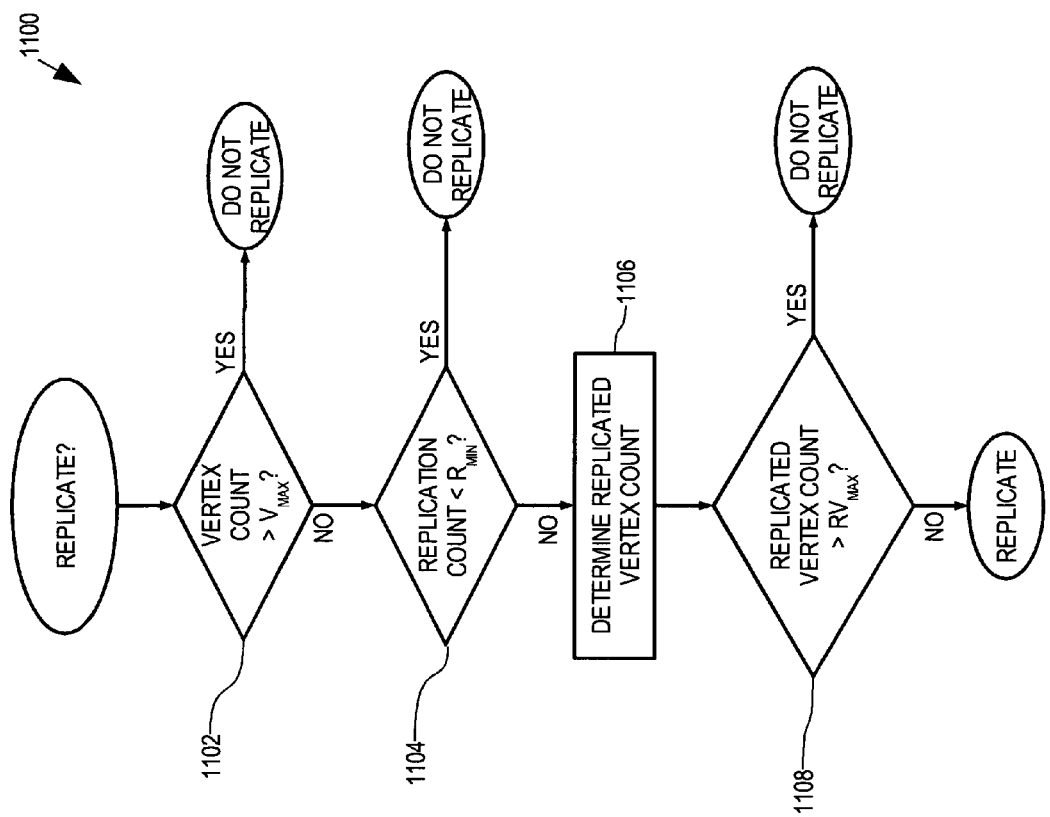
FIG. 11 is a logic flow diagram illustrating the determination as to whether an object that is flagged for replication is the be replicated.

To determine whether a particular object is appropriate for replication in the manner described above, instancing logic 104 evaluates the object as illustrated by logic flow diagram 1100 (FIG. 11). In test step 1102, instancing logic 104 determines whether the number of vertices of the object are greater than a predetermined vertex count threshold. If so, instancing logic 104 determines that the object is not appropriate for replication in the manner described herein. It is preferred that objects represented rarely, i.e., with relatively few instances in the game world, are not replicated since such replication is unlikely to significantly reduce the number of draw commands issued to graphics API 110 and therefore unlikely to significantly improve efficiency. However, in most embodiments of game logic 102, specific information regarding the actual number of instances of a given object is not available when the object is first loaded by game logic 102. Accordingly, the number of vertices of the object is used as a rough indicator of the actual number of instances of the object in the game world. In this illustrative embodiment, the predetermined vertex count threshold is 1,200. In an alternative embodiment, game logic 102 can determine the actual number of instances of the object in the 3D virtual world and determines replication of the object is not appropriate if the actual number of instances is below a predetermined instance count threshold.

If, on the other hand, the number of vertices of the object is no more than the predetermined vertex count threshold, the replication of the object may be appropriate and processing by instancing logic 104 continues with test step 1104. In step 1104, instancing logic 104 determines whether the replication of the object is less than a predetermined replication count minimum. The replication count of the object represents the maximum number of instances of the object that can be drawn with a single draw command sent to graphics API 110 and is determined in the manner described above with respect to step 702 (FIG. 7). The predetermined replication count minimum represents a minimum amount of increased efficiency expected from the reduction in draw commands issued to API 100 to justify the extra burden of combining multiple instances of the object in a single draw command and the amount of extra video memory consumed by such combination. The predetermined replication count minimum is expected to be in the general range of 3 to 4 and should be no less than zero.

If the replication count is below the predetermined replication count minimum, instancing logic 104 determines that the object is not appropriate for replication in the manner described herein. Conversely, if the replication count is at least the predetermined replication count minimum, the replication of the object may be appropriate and processing by instancing logic 104 continues with step 1106.

In step 1106, instancing logic 104 determines the replicated vertex count of the object. The replicated vertex count represents the total number of vertices which are to be represented in vertex buffer 120 and object index buffer 122 and represents an amount of video memory consumed by those buffers. Objects with excessively large replicated vertex counts are precluded from replication to avoid excessive consumption of video memory. To determine whether the object in question has an excessively large replicated vertex count, instancing logic 104 compares the replicated vertex count of the object to a predetermined maximum replicated vertex count in test step 1108.

In this embodiment, the predetermined maximum replicated vertex count is 10,000. In addition, the predetermined maximum replicated vertex count should be constrained by the range of valid vertex indices. For example, if object indices in object index buffer 122 use 16-bit values, the predetermined maximum replicated vertex count should be less than 65,536 since that is the greatest valid vertex index.

If the replicated vertex count is greater than the predetermined maximum replicated vertex count, instancing logic 104 determines that the object is not appropriate for replication in the manner described herein. Conversely, if the replicated vertex count is no more than the predetermined maximum replicated vertex count, instancing logic 104 determines that the replication of the object is appropriate.

Thus, instancing logic 104 only permits replication of an object which is believed to have a significant number of instances in the 3D virtual world, can be represented a significant number of times in a single draw command to graphics API 110, and won't consume excessive video memory if replicated.

In some circumstances, even better efficiency can be achieved by aggregating even more instances of replicated objects into single draw commands issued to graphics API 110. For example, some objects of a 3D virtual world are sufficiently small and/or insignificant to the virtual reality experience that exact orientation of each of the objects is not critical. In addition, many such objects serve their purpose in a 3D virtual world when drawn generally vertical, i.e., oriented generally parallel to the z-axis in world coordinates. An example of such a type of object includes a blade of grass which can be replicated many times with generally vertical orientations to provide an up-close view of a lawn. Limiting objects of such types to only generally vertical orientation in world coordinates allows for a more compact representation of the transformation matrix for each object.

A fully-specified transformation matrix has the following general form:

$$\begin{bmatrix} r_{11} & r_{12} & r_{13} & 0 \\ r_{21} & r_{22} & r_{23} & 0 \\ r_{31} & r_{32} & r_{33} & 0 \\ D_x & D_y & D_z & 1 \end{bmatrix} \quad (1)$$

In matrix (1), $r_{11}$, $r_{12}$, $r_{13}$, $r_{21}$, $r_{22}$, $r_{23}$, $r_{31}$, $r_{32}$, and $r_{33}$ are transformation coefficients which effect rotation about all three (3) axes and scaling. $D_x$, $D_y$, and $D_z$, are translation coefficients and effectively represent a location of an object in world coordinates. The last column contains only constants and so is generally assumed and not represented by game logic 102 and graphics API 110. Accordingly, matrix (1) is typically represented by twelve (12) numerical values.

Since orientation of each instance of the object can be presumed to be generally vertical and is otherwise unimportant, all rotation information can be removed to simplify matrix (1) to the following form:

$$\begin{bmatrix} S_x & 0 & 0 & 0 \\ 0 & S_y & 0 & 0 \\ 0 & 0 & S_z & 0 \\ D_x & D_y & D_z & 1 \end{bmatrix} \quad (2)$$

In matrix (2), $S_x$, $S_y$, and $S_z$, are scaling coefficients and effectively represent a size of an object in three (3) respective dimensions of the world coordinate space. For small and/or insignificant objects, all three scaling coefficients can be presumed to be equal, namely, that $S_x = S_y = S_z = S$.

By omitting constants and using uniform scaling for all three (3) dimensions, matrix (2) can be represented by only four (4) numerical values as follows:

$$[D_x, D_y, D_z, S] \quad (3)$$

Thus, by reducing transformation matrices of matrix palette 124 from twelve (12) numerical values down to four (4) numerical values, three (3) times as many objects can be submitted to graphics API 110 for drawing in a single draw command. To render instances of such an object with such a compacted transformation matrix, graphics API 110 is configured to properly interpret transformation matrices of the form of matrix (3). Such is accomplished using a vertex shader 118 (FIG. 1).

Vertex shaders are known components of graphics APIs and generally include collections of graphics computer instructions and/or data defining a process to apply to each vertex of an object submitted to an API for drawing in a drawing command. Vertex shader 118 of graphics API 110 is configured by game logic 102 and is submitted to graphics API 110 for execution in the context of each vertex of vertex buffer 120. As described above, vertex buffer 120 contains vertices of multiple instances of a single object. Thus, a single draw command to graphics API 110 causes vertex shader 118 to be executed for each vertex of multiple instances of an object.

Figure 12:
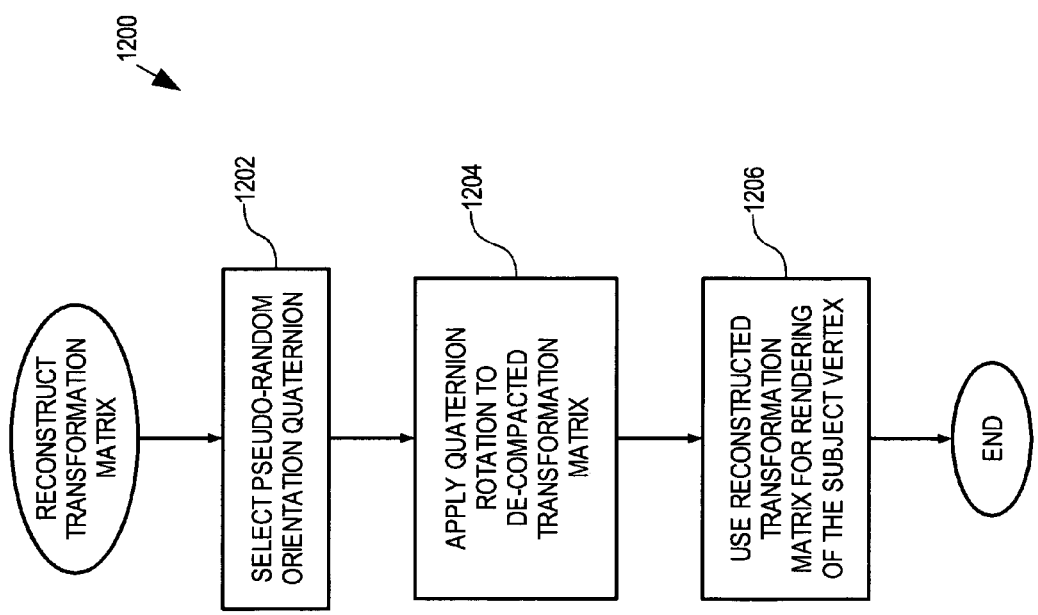
FIG. 12 is a logic flow diagram illustrating the reconstruction of a compacted transformation matrix to enable aggregation of even larger numbers of instances of objects in accordance with the present invention.

Processing of a vertex of vertex buffer 120 by vertex shader 118 is illustrated by logic flow diagram 1200 (FIG. 12). In step 1202, vertex shader 118 selects a pseudo-random rotation quaternion to specify an orientation of the joint with which the vertex is associated. As described above with respect to matrix (3), the exact orientation has been omitted and is presumed to be generally vertical in the world coordinate space. Rotation quaternions are known and are only briefly described herein for completeness. Briefly, rotation quaternions specify a complete orientation in 3D space, including pitch, yaw, and roll. Rotation quaternions can be thought of as three (3) values specifying a vector and a fourth value specifying a rotation about that vector.

While orientation of objects using compacted transformation matrices is generally unimportant, it is important that the orientation of each instance of such object does not change within the virtual world. To appreciate this, it is helpful to consider the example used above of many blades of grass in an up-close view of a lawn. While the orientation of each individual blade of grass is unimportant, it is important that such orientations in the world coordinate space don't change from scene to scene. It would be quite disturbing to a viewer of such a virtual world if each blade of grass changes in orientation randomly with every scene (e.g., 30–60 times per second) or even once. Accordingly, the pseudo-random generation of the rotation quaternion is deterministic and based on elements of the compacted transformation matrix which do not vary—namely, S, $D_x$, $D_y$, and $D_z$. In particular, the rotation quaternion is determined according to the following equations:

$q=(q_x,q_y,q_z,q_w)$ $q_x=f_x(D_x,D_y,D_z,S)$ $q_y=f_y(D_x,D_y,D_z,S)$ $q_z=f_z(D_x,D_y,D_z,S)$ $q_w=f_w(D_x,D_y,D_z,S)$ (4)

Each of the functions $f_x$, $f_y$, $f_z$, and $f_w$ is a pseudo-random number generator which is deterministic and based solely on the shown values from the compacted transformation matrix of the form shown in matrix (3).

In addition, it is preferred that the resulting quaternion, q, is normalized in step 1202. For example, if the many similar objects are blades of grass as described in the example above, the vector, $(q_x,q_y,q_z)$, can be normalized to be generally vertical with a random distribution such that most blades of grass will be nearly vertical while a relatively few blades can deviate substantially from vertical. In addition, $q_w$, specifying rotation about that vector, can vary generally uniformly from 0 to 360 degrees of rotation since orientation about the z-axis for blades of grass can be represented as entirely random. Quaternion, q, can be normalized by adjustment of elements $q_x$, $q_y$, $q_z$, and $q_w$ and/or careful configuration of distributions produced by pseudo-random number generators $f_x$, $f_y$, $f_z$, and $f_w$.

In step 1204 (FIG. 12), vertex shader 118 de-compacts the transformation matrix from the format of matrix (3) to the format of matrix (2) by simply incorporating the assumed constant coefficients and applies rotation specified by the quaternion determined according to equations (4) to form a transformation matrix of the form of matrix (1). Thus, after step 1204, vertex shader 118 has constructed a complete transformation matrix from a compacted transformation matrix of the form of matrix (3). Of course, rather than performing steps 1202–1204 for each and every vertex of vertex buffer 120, it is preferred that re-constructed transformation matrices are cached such that steps 1202–1204 are only required when processing a vertex which refers to a joint not associated with any recently processed vertex.

In step 1206, vertex shader 118 uses the reconstructed transformation matrix to render the subject vertex as vertex shader 118 would have rendered the subject vertex without transformation matrix compacting as described above. Thus, vertex shader 130 processes transformation matrices of one-third the size of conventional transformation matrices and allows three times as many instances of an object to be drawn in a single draw command to graphics API 110 than can be drawn using conventional transformation matrices. Accordingly, vertex shader 130 represents a significant improvement beyond the significant improvement provided using the replicated object drawing process described above.

In another enhancement in the efficiency of object drawing in accordance with the present invention, instancing logic 104 sends only a single copy of the replicated object to graphics API 110 in a single draw command along with a numerical replication count representing the total number of copies of the replicated object to draw. This enhancement is implemented by a second vertex shader 132 sent to graphics API 110 by instancing logic 104 and is illustrated by logic flow diagram 1300.

In one embodiment, graphics API 110 accepts a numerical argument representing a replication count in addition to vertex buffer 120, object index buffer 122, and matrix palette 124 in invocation of a draw command. In an alternative embodiment, graphics API 110 does not accept such an additional numerical argument in invocation of a draw command. In this alternative embodiment, instancing logic 104 communicates the replication count to vertex shader 132 by causing graphics API 110 to store the replication count in a register of constant registers 114 and configuring vertex shader 132 to access that register during execution. In either embodiment, vertex shader 132 has access to a single instance of a replicated object in vertex buffer 120 and object index buffer 122 and a replication count which specifies a number of instances of the replicated object to draw.

Figure 13:
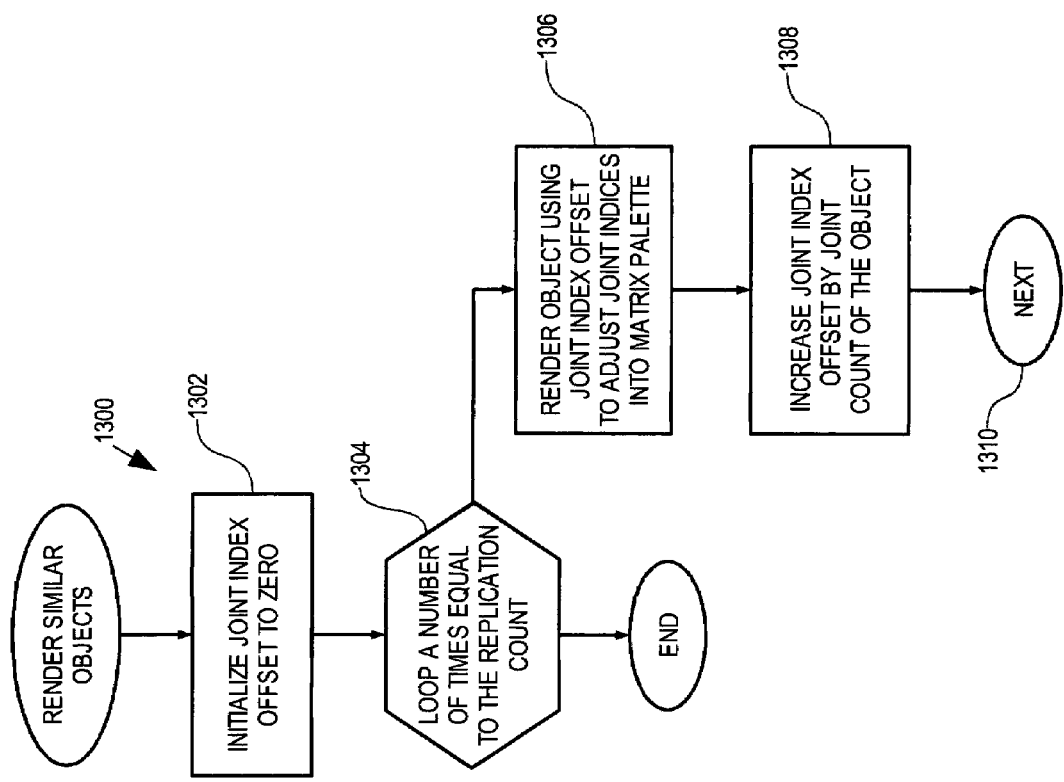
FIG. 13 is a logic flow diagram illustrating an optimization of rendering of multiple instances of the same object in accordance with the present invention.

In step 1302 (FIG. 13), vertex shader 132 initializes a joint index offset to a value of zero, representing no change in the joint indices as represented in vertex buffer 120. Loop step 1304 and next step 1310 define a loop in which vertex shader 132 performs steps 1306–1308 a number of times equal to the replication count.

In step 1306, vertex shader 132 renders the single instance of the replicated object using joint indices represented in vertex buffer 120 after adjustment according to the joint index offset. As described above, the joint index offset is initialized to zero in step 1302. Accordingly, the joint indices represented in vertex buffer 120 are used without adjustment in the first iteration of the loop of steps 1304–1310.

Figure 14:
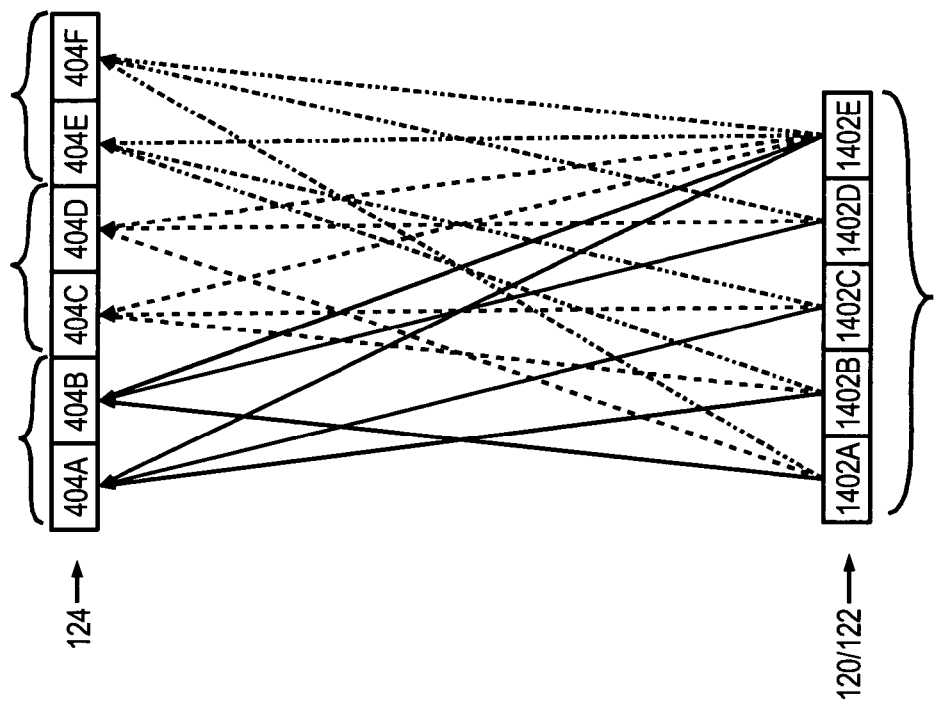
FIG. 14 is a block diagram illustrating replicated and aggregated vertices associated with distinct and independent transformation matrices in accordance with the optimization of FIG. 13.

In step 1308, vertex shader 132 increases the joint index offset by the joint count of the replicated object. Therefore, in the subsequent performance of step 1306, vertex shader 132 renders the single instance of the replicated object using a second set of transformation matrices. FIG. 14 is illustrative.

FIG. 14 is similar to FIG. 4 except that only one instance of the replicated object is represented by vertices 1402A–E. In the first iteration of the loop of steps 1304–1310, vertex shader 132 renders vertices 1402A–E using transformation matrices 404A–B in the manner described above with respect to vertices 404A–E (FIG. 4) since the joint index offset is initially zero. In the second iteration of the loop of steps 1304–1310, the joint index offset is now increased by the joint count, e.g., two, and vertex shader 132 renders vertices 1402A–E using transformation matrices 404C–D due to the current value of the joint index offset. This is illustrated by dashed arrows in FIG. 14. In the third iteration of the loop of steps 1304–1310, the joint index offset is now increased a second time by the joint count, e.g., two, and vertex shader 132 renders vertices 1402A–E using transformation matrices 404E–F due to the current value of the joint index offset. This is illustrated by dotted-dashed arrows in FIG. 14.

When the loop of steps 1304–1310 has been processed by vertex shader 132 the number of times equal to the replication count, processing according to logic flow diagram 1300 completes. As FIGS. 4 and 14 illustrate, this enhancement reduces video memory consumption of object replication by an amount proportional to the replication count. Accordingly, this reduction in video memory consumption can be very significant.

The above description is illustrative only and is not limiting. Instead, the present invention is defined solely by the claims which follow and their full range of equivalents.

What is claimed is:

1. A method for drawing multiple objects in a computer display, the method comprising:
   combining a respective transformation matrix collection for each of the multiple objects into an aggregated transformation matrix collection;
   making the aggregated transformation matrix collection available to an application programming interface that is capable of drawing the multiple objects;
   combining a respective vertex collection for each of the multiple objects into an aggregated vertex collection; and
   sending the aggregated vertex collection to the application programming interface so as to cause the application programming interface to draw the multiple objects according to the aggregated vertex collection and the aggregated transformation matrix collection.

2. The method of claim 1 wherein sending the aggregated vertex collection comprises:
   issuing exactly one single draw command to the application programming interface.

3. The method of claim 1 further comprising:
   repeating making and sending to cause the application programming interface to re-draw the multiple objects using the same aggregated vertex collection unmodified.

4. The method of claim 3 further comprising:
   modifying one or more transformation matrix of the aggregated transformation matrix collection prior to repeating making and sending to cause one or more of the multiple objects to be re-drawn differently than a prior drawing of the one or more objects.

5. The method of claim 1 wherein combining a respective vertex collection for each of the multiple objects comprises:
   copying a selected vertex collection which corresponds to a selected one of the multiple objects to form the respective vertex collections of one or more others of the multiple objects; and
   modifying transformation matrix references of the respective vertex collections of the other objects such that transformation matrices referenced by the respective vertex collections of the other objects are different from transformation matrices referenced by the selected vertex collection.

6. The method of claim 1 wherein combining a respective vertex collection for each of the multiple objects is performed in conjunction with initial loading of the multiple objects.

7. The method of claim 1 wherein combining a respective vertex collection for each of the multiple objects consists essentially of:
   sending a selected vertex collection which corresponds to a selected one of the multiple objects to the application programming interface; and
   configuring the application programming interface to use the selected vertex collection in conjunction each of the respective transformation matrix collections within the aggregated transformation matrix collection to draw the multiple objects.

8. The method of claim 1 wherein making the aggregated transformation matrix collection available to an application programming interface comprises:
   sending the aggregated transformation matrix collection to a vertex shader of the application programming interface.

9. The method of claim 1 wherein making the aggregated transformation matrix collection available to an application programming interface comprises:
   sending the aggregated transformation matrix collection to a vertex shader of the application programming interface prior to the sending of the aggregated vertex collection to the applications programming interface.

* * * * *